United States Patent
Jang et al.

(10) Patent No.: US 11,279,369 B2
(45) Date of Patent: Mar. 22, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Byungjin Jang, Suwon-si (KR); Kang Sun Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 242 days.

(21) Appl. No.: 16/840,784

(22) Filed: Apr. 6, 2020

(65) Prior Publication Data
US 2021/0163020 A1 Jun. 3, 2021

(30) Foreign Application Priority Data

Dec. 2, 2019 (KR) .......................... 10-2019-0158441

(51) Int. Cl.
*B60W 50/00* (2006.01)
*B60W 50/023* (2012.01)
*B60W 50/02* (2012.01)

(52) U.S. Cl.
CPC ...... *B60W 50/023* (2013.01); *B60W 50/0205* (2013.01); *B60W 50/0225* (2013.01); *B60W 2050/0215* (2013.01)

(58) Field of Classification Search
CPC .......... B60W 50/023; B60W 50/0225; B60W 50/0205; B60W 2050/0215; B60R 16/02; B60R 16/005; B60S 1/60; B60Y 2400/30
See application file for complete search history.

(56) References Cited

U.S. PATENT DOCUMENTS 11,126,165 B2 * 9/2021 Watson, Jr. ............... G06F 1/20

* cited by examiner

*Primary Examiner* — Ian Jen
(74) *Attorney, Agent, or Firm* — McDonnell Boehnen Hulbert & Berghoff LLP

(57) ABSTRACT

A vehicle and a method of controlling the vehicle are provided, and an aspect of the disclosure is to provide a sensor module that can significantly increase a sensor replacement cycle of a vehicle to suppress the consumption of time and money according to sensor replacement. The vehicle includes a sensor module having a plurality of sensors connected in parallel and a plurality of switches configured to selectively activate each of the plurality of sensors, and a controller configured to selectively turn on/turn off each of the plurality of switches to generate a control signal for selectively activating the plurality of sensors and transmit the generated control signal to the sensor module.

17 Claims, 6 Drawing Sheets

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2019-0158441, filed on Dec. 2, 2019 in the Korean Intellectual Property Office, the disclosure of which is incorporated by reference in its entirety.

TECHNICAL FIELD

The disclosure relates to a vehicle, and more particularly, to a sensor provided in the vehicle.

BACKGROUND

Various types of sensors are used in a vehicle to detect an operation state of the vehicle at various positions or to detect various phenomena occurring in the vehicle. When the sensors are used for a long time, impurities can attach or the sensor themselves can deteriorate and the sensor then is usually replaced with a new product.

The shorter a replacement cycle of the sensor, the more often the sensor needs to be replaced, which increases the consumption of time and money according to sensor replacement.

SUMMARY

Therefore, it is an aspect of the disclosure to provide a sensor module that can significantly increase a sensor replacement cycle of a vehicle to suppress the consumption of time and money required for sensor replacement.

Additional aspects of the disclosure will be set forth in part in the description which follows and, in part, will be obvious from the description, or may be learned by practice of the disclosure.

In accordance with an aspect of the disclosure, a vehicle includes a sensor module having a plurality of sensors connected in parallel and a plurality of switches configured to selectively activate each of the plurality of sensors, and a controller configured to selectively turn on/turn off each of the plurality of switches to generate a control signal for selectively activating the plurality of sensors and to transmit the generated control signal to the sensor module.

When the activated one sensor of the plurality of sensors reaches the end of its life, the controller may be configured to deactivate the one sensor and to activate the other one of the plurality of sensors.

When a value obtained by dividing the change in resistance of the activated one sensor by an initial resistance of the one sensor exceeds a preset reference value, the controller may be configured to determine that the one sensor has reached the end of its life.

Each of the plurality of sensors may be further provided with a self-cleaning device. The controller may be configured to extend the life of each of the plurality of sensors through driving of the self-cleaning device.

The driving of the self-cleaning device may be controlled by the controller.

The driving of the self-cleaning device may be controlled by each of the plurality of sensors.

The plurality of sensors are sensors of the same type and the same standard.

The activation the plurality of sensors may supply power to the plurality of sensors. The power may be supplied to the plurality of sensors when the plurality of switches are turned on.

In accordance with another aspect of the disclosure, in a method of controlling a vehicle, the vehicle includes a sensor module having a plurality of sensors connected in parallel and a plurality of switches configured to selectively activate each of the plurality of sensors, and a controller configured to selectively turn on/turn off each of the plurality of switches to generate a control signal for selectively activating the plurality of sensors and transmit the generated control signal to the sensor module. The method includes activating any one of the plurality of sensors, measuring the life of the activated one sensor, and when the activated one sensor reaches the end of life, deactivating the one sensor and activating the other one of the plurality of sensors.

When a value obtained by dividing the change in resistance of the activated one sensor by an initial resistance of the one sensor exceeds a preset reference value, the method includes determining that the one sensor has reached the end of its life.

Each of the plurality of sensors may be further provided with a self-cleaning device. The controller may be configured to extend the life of each of the plurality of sensors through driving of the self-cleaning device.

The driving of the self-cleaning device may be controlled by the controller.

The driving of the self-cleaning device may be controlled by each of the plurality of sensors.

The plurality of sensors are sensors of the same type and the same standard.

The activation the plurality of sensors may supply power to the plurality of sensors. The power may be supplied to the plurality of sensors when the plurality of switches are turned on.

In accordance with another aspect of the disclosure, a vehicle includes a sensor module having a plurality of sensors connected in parallel and a plurality of switches configured to selectively activate each of the plurality of sensors, and a controller configured to selectively turn on/turn off each of the plurality of switches to generate a control signal for selectively activating the plurality of sensors and to transmit the generated control signal to the sensor module, when the activated one sensor of the plurality of sensors reaches the end of life, to deactivate the one sensor and activate the other one of the plurality of sensors, and when a value obtained by dividing the change in resistance of the activated one sensor by an initial resistance of the one sensor exceeds a preset reference value, to determine that the one sensor has reached the end of its life.

In accordance with another aspect of the disclosure, in a method of controlling a vehicle, the vehicle includes a sensor module having a plurality of sensors connected in parallel and a plurality of switches configured to selectively activate each of the plurality of sensors, and a controller configured to selectively turn on/turn off each of the plurality of switches to generate a control signal for selectively activating the plurality of sensors and transmit the generated control signal to the sensor module. The method includes activating any one of the plurality of sensors, measuring the life of the activated one sensor; and when the activated one sensor reaches the end of its life, deactivating the one sensor and activating the other one of the plurality of sensors. When a value obtained by dividing the change in resistance of the activated one sensor by an initial resistance of the one sensor exceeds a preset reference value, the method includes determining that the one sensor has reached the end of its life.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
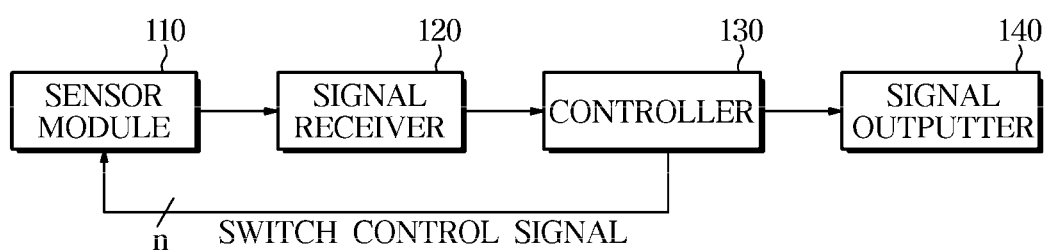
FIG. 1 is a view illustrating a control system of a vehicle according to an embodiment of the disclosure.

FIG. 1 is a view illustrating a control system of a vehicle according to an embodiment of the disclosure. A control system of a vehicle illustrated in FIG. 1 may be provided to receive, process, and output a detection signal of a sensor module 110. As illustrated in FIG. 1, the control system of the vehicle according to an embodiment of the disclosure may include a sensor module 110, a signal receiver 120, a controller 130, and a signal outputter 140.

The sensor module 110 may be provided to detect various objects required for driving and controlling the vehicle. The sensor module 110 may include, for example, at least one of a contact combustion sensor, a semiconductor sensor, an electrochemical sensor, and an infrared spectroscopy sensor. The contact combustion sensor may include a bad breath sensor, a drinking sensor, a stress sensor, or a gas sensor. The semiconductor sensor and the electrochemical sensor may include a fat burning sensor, a hangover sensor, a dehydration sensor, and an indoor air quality sensor. The infrared spectroscopy sensor may include a gas sensor, the drinking sensor, a blood glucose sensor, and a drowsiness/emotion sensor.

The signal receiver 120 may be provided to receive an electrical signal generated through the detection of the sensor module 110 to perform processes such as filtering and amplifying. The detection signal processed by the signal receiver 120 may be transmitted to the controller 130.

The controller 130 may receive the detection signal transmitted from the signal receiver 120 and transmit the detection signal to the signal outputter 140 so that the detection signal can be transmitted to the object to be transmitted. The controller 130 may generate a switch control signal for controlling the sensor module 110. The switch control signal may be used to selectively turn on/off the plurality of switches SW1, SW2, SW3, . . . , and SWn provided in the sensor module 110. This will be described in more detail with reference to FIG. 2 to be described later.

The signal outputter 140 may transmit the detection signal transmitted from the controller 130 to a designated object component, so that a detection result of the sensor module 110 can be used for driving and controlling the vehicle.

Figure 2:
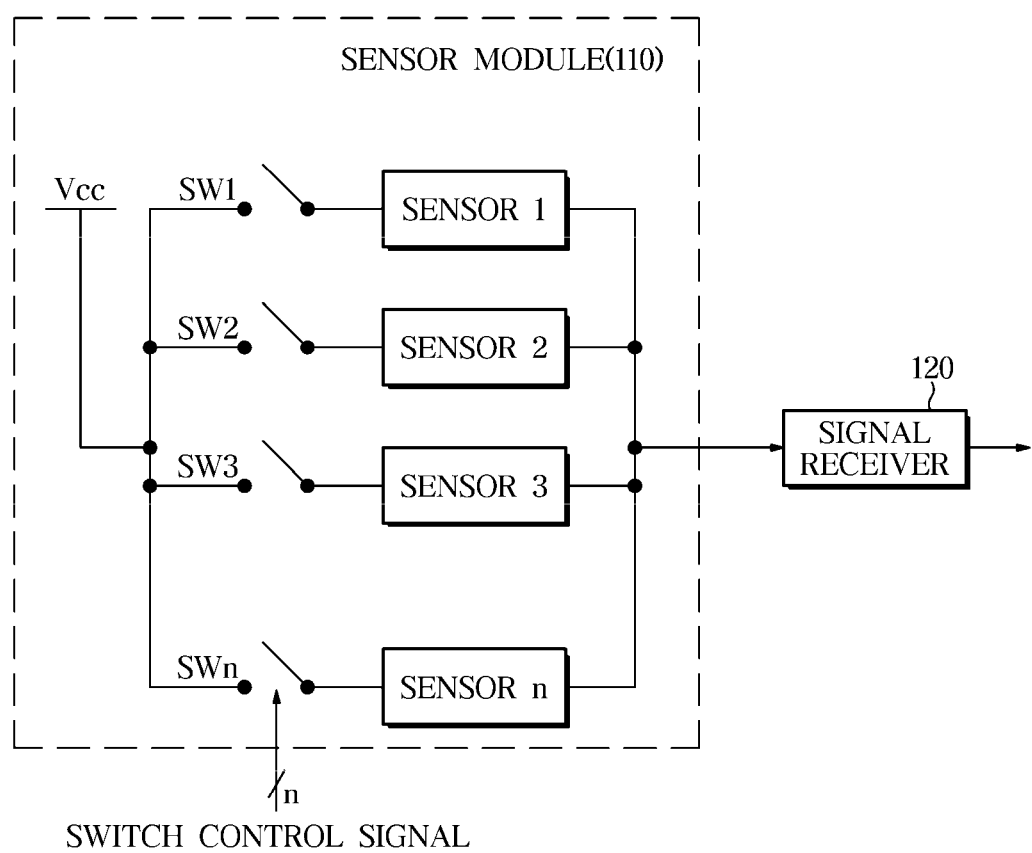
FIG. 2 is a view illustrating a configuration of a sensor module illustrated in FIG. 1.

FIG. 2 is a view illustrating a configuration of a sensor module illustrated in FIG. 1.

Referring to FIG. 2, a plurality of sensors 1, 2, 3, . . . , and n are connected in parallel to one sensor module 110. The plurality of sensors 1, 2, 3, . . . , and n provided in the sensor module 110 are all the same type and the same standard. The use of the plurality of sensors 1, 2, 3, . . . , and n of the same type and the same standard in parallel with the sensor module 110 may be intended to significantly reduce the number of sensor replacements by deactivating sensor 1 at the end of its life using one sensor (for example, sensor 1) and then activating another sensor that has not been used (for example, sensor 2).

To this end, each of the plurality of sensors 1, 2, 3, . . . , and n may be provided switches SW1, SW2, SW3, . . . , and SWn for selectively supplying/blocking power supplied from a power source Vcc for each sensor 1, 2, 3, . . . , and n. Each of the plurality of switches SW1, SW2, SW3, . . . , and SWn is independently turned on/off by n switch control signals generated by the controller 130 and input to the sensor module 110.

The controller 130 may generate the switch control signal for activating only the sensor 1 and deactivating the remaining sensors 2, 3, . . . , and n among the plurality of sensors 1, 2, 3, . . . , and n of the sensor module 110 so that only the switch SW1 is turned on and the remaining switches SW2, SW3, . . . , and SWn are turned off. In this case, a desired sensing operation may be performed only through the activated sensor 1, and the remaining sensors 2, 3, . . . , and n are not used.

When the sensor 1 needs to be replaced by another sensor due to the end of life, the controller 130 may turn off the switch SW1 to deactivate the sensor 1 and turn on the switch SW2 to activate the remaining sensor (for example, sensor 2) that has not been used. To this end, the controller 130 may generate a new switch control signal for turning off the switch SW1 and turning on the switch SW2, and may transmit the new switch control signal to the sensor module 110. In this way, the sensor module 110 itself may be replaced with a new product when both the sensor 3, the sensor 4, and the last sensor n are used for the life. Since sensor replacement work is not performed until the plurality of sensors 1, 2, 3, . . . , and n provided in the sensor module 110 are all used, the sensor replacement cycle may be lengthened.

Figure 3:
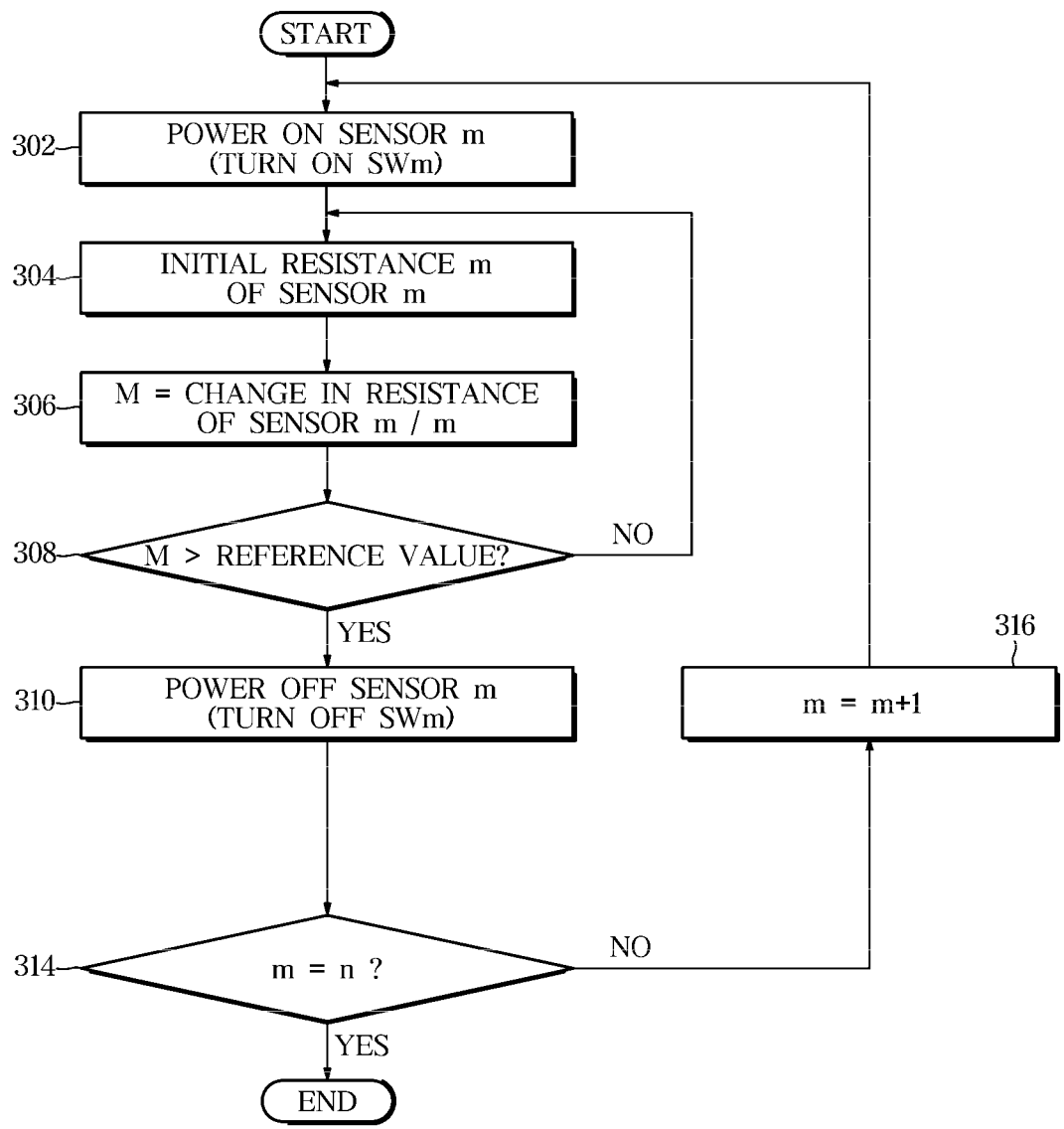
FIG. 3 is a view illustrating a method of controlling a vehicle according to an embodiment of the disclosure.

FIG. 3 is a view illustrating a method of controlling a vehicle according to an embodiment of the disclosure. FIG. 3 illustrates a method of controlling the sensor module 110 provided in the vehicle. The method of controlling the vehicle illustrated in FIG. 3 is based on the apparatus configuration of FIGS. 1 and 2 described above.

First, the controller 130 may turn on the switch SW1 connected to the sensor m to activate the sensor m which is any one of the plurality of sensors 1, 2, 3, . . . , and N provided in the sensor module 110 (302).

The controller 110 may monitor whether the sensor m reaches its end of life while activating and using the sensor m. The life of each of the sensors 1, 2, 3, . . . , n is made based on a resistance value (change amount) of each of the sensors 1, 2, 3, . . . , and n as illustrated in operations 304, 306, and 308 of FIG. 3.

For example, the controller 130 may measure an initial resistance m of the sensor m (304). Here, the initial resistance m is a resistance value of the sensor m measured before the sensor m is activated (before being used).

Subsequently, the controller 130 may calculate a value M obtained by dividing the change amount of the resistance of the sensor m by the initial resistance m (306). That is, the performance is degraded as the sensor m is used, the degradation of the sensor m may appear as a change in the resistance value of the sensor m. Therefore, the controller 130 may determine the degradation of the sensor m through the value M obtained by dividing the change amount of the resistance of the sensor m by the initial resistance m.

The controller 130 may determine that the sensor m has reached the end of its life when the M value of the sensor m exceeds a preset reference value (YES in 308), and may turn off the switch SWm connected to the sensor m to deactivate the sensor m (310). Here, the preset reference value is a value that becomes a reliable reference value of the detection value of each of the plurality of sensors 1, 2, 3, . . . , and N, and when the M value of each of the plurality of sensors 1, 2, 3, . . . , and n exceeds the preset reference value, it means that the detection value of the corresponding sensor is unreliable.

When the sensor m is the last sensor n of the plurality of sensors 1, 2, 3, . . . , and n (YES in 314), the controller 130 may induce the operation of the sensor module 110 to be stopped and replaced with another new sensor module 110.

In contrast, when sensor m is not the last sensor n of the plurality of sensors 1, 2, 3, . . . , and n (NO in 314), the controller 130 may select the next sensor m+1 and turn on the switch SWm+1 of the corresponding sensor m+1 so that the sensor m+1 is activated (316). The controller 130 may perform the process for all of the plurality of sensors 1, 2, 3, . . . , and n provided in the sensor module 110.

Figure 4:
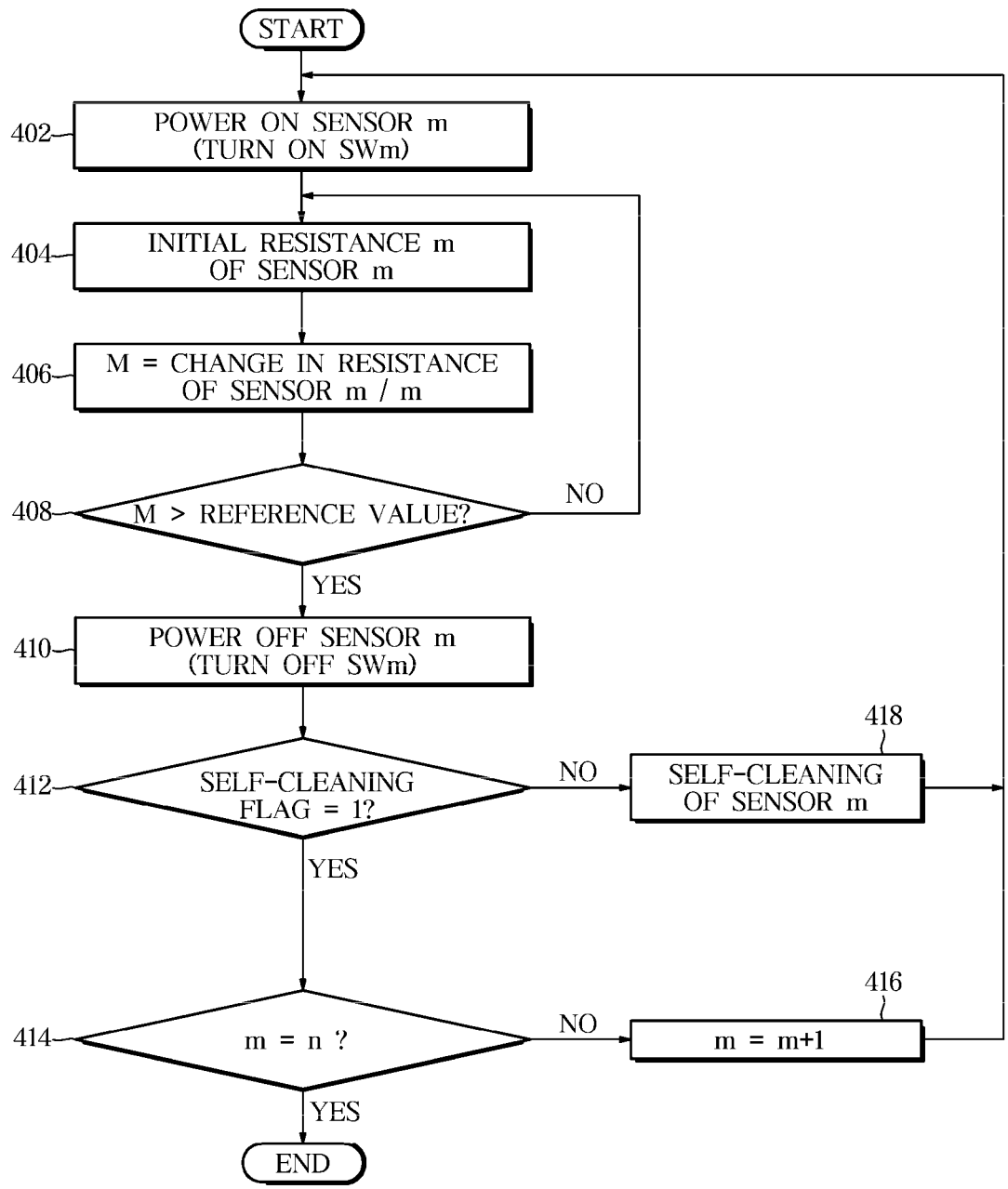
FIG. 4 is a view illustrating a method of controlling a vehicle according to another embodiment of the disclosure.

FIG. 4 is a view illustrating a method of controlling a vehicle according to another embodiment of the disclosure. FIG. 4 illustrates another method of controlling the sensor module 110 provided in the vehicle. In particular, in FIG. 4, a self-cleaning process for extending the life of the sensor module 110 is further added. The method of controlling the vehicle illustrated in FIG. 4 is based on the apparatus configuration of FIGS. 1 and 2 described above.

First, the controller 130 may turn on the switch SW1 connected to the sensor m to activate the sensor m which is any one of the plurality of sensors 1, 2, 3, . . . , and N provided in the sensor module 110 (402).

The controller 110 may monitor whether the sensor m has reached its end of life while activating and using the sensor m. The life of each of the sensors 1, 2, 3, . . . , n is made based on the resistance value (change amount) of each of the sensors 1, 2, 3, . . . , and n as illustrated in operations 404, 406, and 408 of FIG. 4.

For example, the controller 130 may measure the initial resistance m of the sensor m (404). Here, the initial resistance m is a resistance value of the sensor m measured before the sensor m is activated (before being used).

Subsequently, the controller 130 may calculate a value M obtained by dividing the amount of change in resistance of the sensor m by the initial resistance m (406). That is, the performance is degraded as the sensor m is used, the degradation of the sensor m may appear as a change in the resistance value of the sensor m. Therefore, the controller 130 may determine the degradation of the sensor m through the value M obtained by dividing the amount of change in resistance of the sensor m by the initial resistance m.

The controller 130 may determine that the sensor m has reached the end of its life when the M value of the sensor m exceeds a preset reference value (YES in 408), and may turn off the switch SWm connected to the sensor m to deactivate the sensor m (410). Here, the preset reference value is a value that becomes a reliable reference value of the detection value of each of the plurality of sensors 1, 2, 3, . . . , and N, and when the M value of each of the plurality of sensors 1, 2, 3, . . . , and n exceeds the preset reference value, it means that the detection value of the corresponding sensor is unreliable.

Herein, the controller 130 may identify whether a self-cleaning flag of the sensor m is "1" (412). The self-cleaning flag is a value indicating whether the corresponding sensor has performed self-cleaning before. When the self-cleaning flag of the corresponding sensor is "1", it means that the corresponding sensor has performed the self-cleaning before. On the contrary, when the self-cleaning flag of the corresponding sensor is "0", it means that the corresponding sensor has not performed the self-cleaning before. The self-cleaning of the sensors 1, 2, 3, . . . , and n may be performed by self-cleaning each of the plurality of sensors 1, 2, 3, . . . , and n through self-cleaning devices provided in each of the plurality of sensors 1, 2, 3, . . . , and n constituting the sensor module 110 to extend the life of each of the plurality of sensors 1, 2, 3, . . . , and n. The self-cleaning of the sensors 1, 2, 3, . . . , and n may include, for example, removing impurities (e.g., gas molecules, etc.) bound to each of the plurality of sensors 1, 2, 3, . . . , and n by causing the catalyst to generate heat using a heater provided in each of the plurality of sensors 1, 2, 3, . . . , and n. Alternatively, the impurities may be removed by applying a large amount of current to each of the plurality of sensors 1, 2, 3, . . . , and n to induce self-heating. In addition, the catalyst of each of the plurality of sensors 1, 2, 3, . . . , and n may be activated at room temperature by irradiating light to each of the plurality of sensors 1, 2, 3, . . . , and n through an ultraviolet LED.

Figure 5:
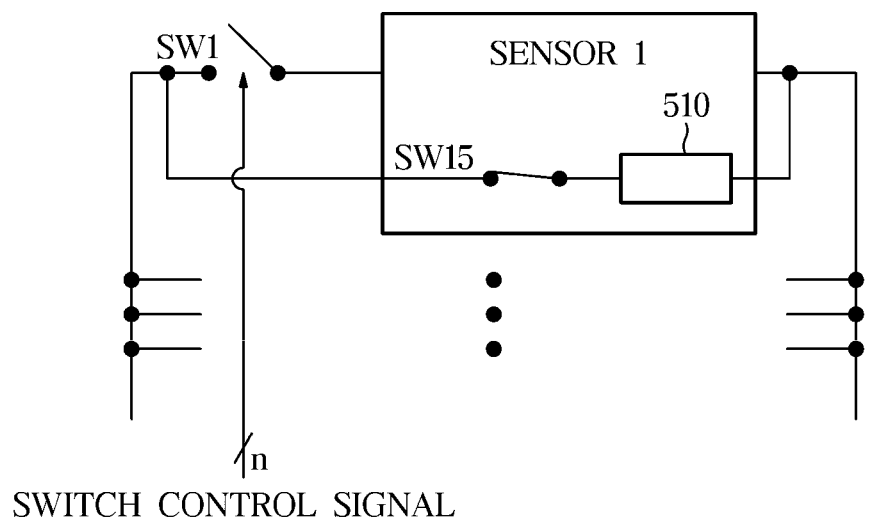
FIGS. 5 and 6 are views illustrating another embodiment of a sensor module according to an embodiment of the disclosure.
Figure 6:
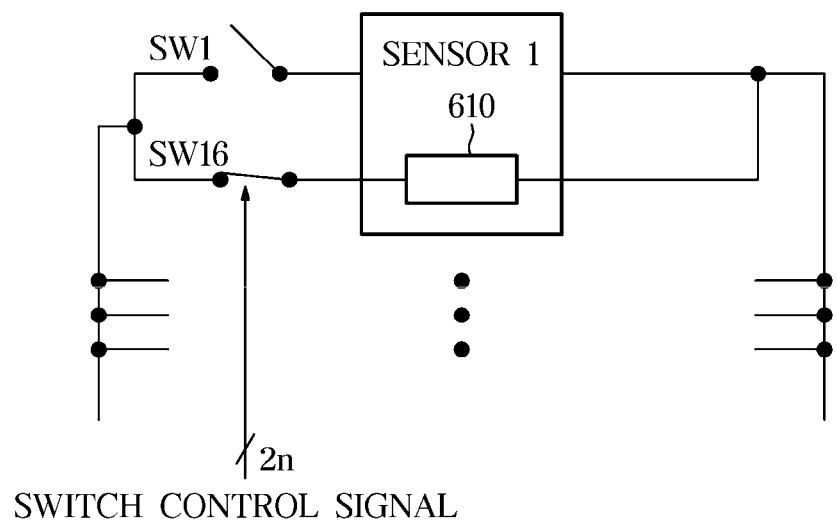

FIGS. 5 and 6 are views illustrating another embodiment of a sensor module according to an embodiment of the disclosure.

The sensor module 110 of FIGS. 5 and 6 may further include self-cleaning devices (e.g., the heater or the ultraviolet LED) 510 and 610 for self-cleaning. In FIG. 5, a switch SW15 may be provided in the sensor itself, and the self-cleaning device 510 may be operated by selectively turning on/off the switch SW15 by the sensor itself. In FIG. 6, a separate switch SW16 for operating the sensor self-cleaning device 610 may be provided outside the sensor, and the controller 130 may operate the self-cleaning device 610 by selectively turning on/off the switch SW16 through the separate switch control signal.

Returning to FIG. 4, the controller 130 may extend the life of the sensor m by performing self-cleaning of the sensor m (418) when the self-cleaning flag of the sensor m is not "1" (NO in 412). That is, the service life of the sensor m may be further extended by removing the impurities attached to the sensor m through self-cleaning in the process of using the sensor m.

When the self-cleaning flag of the sensor m is "1" (YES in 412) and the sensor m is the last sensor n (YES in 414) of the plurality of sensors 1, 2, 3, . . . , and n, the controller 130 may induce the operation of the sensor module 110 to be stopped and replaced with another new sensor module 110.

In contrast, when the self-cleaning flag of the sensor m is "1" (YES in 412) and the sensor m is not the last sensor n of the plurality of sensors 1, 2, 3, . . . , and n (NO in 414), the controller 130 may select the next sensor m+1 and turn on the switch SWm+1 of the corresponding sensor m+1 so that the sensor m+1 is activated (416). The controller 130 may perform the process for all of the plurality of sensors 1, 2, 3, . . . , and n provided in the sensor module 110.

According to the exemplary embodiments of the disclosure, there is an effect of providing the sensor module that can significantly increase the sensor replacement cycle of the vehicle to suppress the consumption of time and money according to the sensor replacement.

The disclosed embodiments are merely illustrative, and those skilled in the art will appreciate that various modifications, changes, and substitutions may be made without departing from the essential characteristics thereof. Therefore, the exemplary embodiments disclosed above and the accompanying drawings are not intended to limit the technical idea, but to describe the technical spirit, and the scope of the technical idea is not limited by the embodiments and the accompanying drawings. The scope of protection shall be interpreted by the following claims, and all technical ideas within the scope of equivalents shall be interpreted as being included in the scope of rights.

What is claimed is:

1. A vehicle comprising:
    a sensor module having a plurality of sensors connected in parallel and a plurality of switches configured to selectively activate each of the plurality of sensors; and
    a controller configured to selectively turn on and turn off each of the plurality of switches to generate a control signal for selectively activating the plurality of sensors and transmit the generated control signal to the sensor module.

2. The vehicle according to claim 1, wherein, when an activated one sensor of the plurality of sensors reaches an end of life, the controller is configured to deactivate the one sensor and to activate another one of the plurality of sensors.

3. The vehicle according to claim 2, wherein, when a value obtained by dividing a change in resistance of the activated one sensor by an initial resistance of the one sensor exceeds a preset reference value, the controller is configured to determine that the one sensor has reached the end of life.

4. The vehicle according to claim 1, wherein each of the plurality of sensors is further provided with a self-cleaning device, and
    wherein the controller is configured to extend the life of each of the plurality of sensors through driving of the self-cleaning device.

5. The vehicle according to claim 4, wherein the driving of the self-cleaning device is controlled by the controller.

6. The vehicle according to claim 4, wherein the driving of the self-cleaning device is controlled by each of the plurality of sensors.

7. The vehicle according to claim 1, wherein the plurality of sensors are sensors of a same type and a same standard.

8. The vehicle according to claim 1, wherein the activation the plurality of sensors supplies power to the plurality of sensors, and
    wherein the power is supplied to the plurality of sensors when the plurality of switches are turned on.

9. A method of controlling a vehicle, the vehicle including a sensor module having a plurality of sensors connected in parallel and a plurality of switches configured to selectively activate each of the plurality of sensors, and a controller configured to selectively turn on and turn off each of the plurality of switches to generate a control signal for selectively activating the plurality of sensors and to transmit the generated control signal to the sensor module, the method comprising:
    activating any one of the plurality of sensors;
    measuring the life of the activated one sensor; and
    when the activated one sensor reaches an end of life, deactivating the one sensor and activating the other one of the plurality of sensors.

10. The method according to claim 9, wherein, when a value obtained by dividing the change in resistance of the activated one sensor by an initial resistance of the one sensor exceeds a preset reference value, determining that the one sensor has reached the end of life.

11. The method according to claim 9, wherein each of the plurality of sensors is further provided with a self-cleaning device, and
    wherein the controller is configured to extend the life of each of the plurality of sensors through driving of the self-cleaning device.

12. The method according to claim 11, wherein the driving of the self-cleaning device is controlled by the controller.

13. The method according to claim 11, wherein the driving of the self-cleaning device is controlled by each of the plurality of sensors.

14. The method according to claim 9, wherein the plurality of sensors are sensors of a same type and a same standard.

15. The method according to claim 9, wherein the activation the plurality of sensors supplies power to the plurality of sensors, and
    wherein the power is supplied to the plurality of sensors when the plurality of switches are turned on.

16. A vehicle comprising:
    a sensor module having a plurality of sensors connected in parallel and a plurality of switches configured to selectively activate each of the plurality of sensors; and
    a controller configured to:
        selectively turn on and turn off each of the plurality of switches to generate a control signal for selectively activating the plurality of sensors and transmit the generated control signal to the sensor module;
        when the activated one sensor of the plurality of sensors reaches an end of life, deactivate the one sensor and activate the other one of the plurality of sensors; and
        when a value obtained by dividing the change in resistance of the activated one sensor by an initial resistance of the one sensor exceeds a preset reference value, determine that the one sensor has reached the end of life.

17. A method of controlling a vehicle, the vehicle including a sensor module having a plurality of sensors connected in parallel and a plurality of switches configured to selectively activate each of the plurality of sensors, and a controller configured to selectively turn on and turn off each of the plurality of switches to generate a control signal for selectively activating the plurality of sensors and transmit the generated control signal to the sensor module, the method comprising:
    activating any one of the plurality of sensors;
    measuring the life of the activated one sensor; and
    when the activated one sensor reaches an end of life, deactivating the one sensor and activating the other one of the plurality of sensors,
    wherein, when a value obtained by dividing the change in resistance of the activated one sensor by an initial resistance of the one sensor exceeds a preset reference value, determining that the one sensor has reached the end of life.

* * * * *